(12) United States Patent
Patel

(10) Patent No.: US 12,051,893 B2
(45) Date of Patent: Jul. 30, 2024

(54) MULTI-DIRECTIONAL HIGH-VOLTAGE BATTERY INPUT/OUTPUT IN HIGH-VOLTAGE ELECTRONIC BOX

(71) Applicant: Vitesco Technologies USA, LLC, Auburn Hills, MI (US)

(72) Inventor: Mitul Patel, Schaumburg, MI (US)

(73) Assignee: Vitesco Technologies USA, LLC, Auburn Hills, MI (US)

(*) Notice: Subject to any disclaimer, the term of this patent is extended or adjusted under 35 U.S.C. 154(b) by 319 days.

(21) Appl. No.: 17/644,638

(22) Filed: Dec. 16, 2021

(65) Prior Publication Data

US 2023/0198239 A1   Jun. 22, 2023

(51) Int. Cl.
*H02G 5/08* (2006.01)
*H02G 3/08* (2006.01)

(52) U.S. Cl.
CPC ............... *H02G 5/08* (2013.01); *H02G 3/083* (2013.01)

(58) Field of Classification Search
CPC .......... H02G 3/083; H02G 3/086; H02G 3/16; H02G 5/08; H01M 50/507
See application file for complete search history.

(56) References Cited

U.S. PATENT DOCUMENTS

| 4,460,288 A | * | 7/1984 | Schaff | E04B 1/1903 403/171 |
| 6,635,824 B1 | * | 10/2003 | Oka | H01R 9/226 439/949 |
| 9,407,024 B2 | * | 8/2016 | Wu | H01R 13/641 |
| 2010/0251847 A1 | * | 10/2010 | Gordy | F16C 1/14 74/502.6 |

* cited by examiner

*Primary Examiner* — William H. Mayo, III
*Assistant Examiner* — Rhadames Alonzo Miller

(57) ABSTRACT

A high-voltage electronic box assembly, having a high-voltage electronic box and a multi-directional connector assembly inside the high-voltage electronic box, and a junction box housing is connected to the high-voltage electronic box differently in each of a plurality of configurations. A negative terminal is connected to the first negative bus bar in a first of the plurality of configurations and a second of the plurality of configurations, and the negative terminal is connected to the second negative bus bar in a third of the plurality of configurations and a fourth of the plurality of configurations, a positive terminal is connected to the first positive bus bar in the first of the plurality of configurations and the second of the plurality of configurations, and the positive terminal is connected to the second positive bus bar in the third of the plurality of configurations and the fourth of the plurality of configurations.

28 Claims, 11 Drawing Sheets

MULTI-DIRECTIONAL HIGH-VOLTAGE BATTERY INPUT/OUTPUT IN HIGH-VOLTAGE ELECTRONIC BOX

FIELD OF THE INVENTION

The invention relates generally to a multi-directional connector assembly located inside a high-voltage electronic box, where the multi-directional connector assembly is connected to a junction box housing in one of several configurations.

BACKGROUND OF THE INVENTION

Current high-voltage (HV) electronic boxes have non-configurable battery input/output. Therefore, the battery cable connected to the electronic box may be oriented only in one direction. This limits the various applications an HV electronic box may be used for.

Accordingly, there exists a need for configurable connection between an HV electronic box and a battery, which is suitable for multiple applications, provides for multiple orientations and connections between the HV box and the battery, and also meets various packaging requirements.

SUMMARY OF THE INVENTION

In an embodiment, the present invention is a multi-directional connector assembly which may be oriented in multiple directions, and in one embodiment, is able to be oriented in four directions. In an embodiment, the multi-directional connector includes bus bars which are specifically formed such that a single bus bar per line may be used for all four configurations. This allows for multiple configurable connections between a high-voltage (HV) electronic box and a battery.

In an embodiment, the present invention is a high-voltage electronic box assembly, which has a high-voltage electronic box and a multi-directional connector assembly located inside the high-voltage electronic box. In an embodiment, multi-directional connector assembly includes a first negative bus bar, a second negative bus bar connected to an in electrical communication with the first negative bus bar, a negative lead is connected to and in electrical communication with the first negative bus bar and the second negative bus bar, a first positive bus bar, a second positive bus bar connected to an in electrical communication with the first positive bus bar, and a positive lead is connected to and in electrical communication with the first positive bus bar and the second positive bus bar. In an embodiment, multi-directional connector assembly includes an inner support housing, and the first negative bus bar, the second negative bus bar, the first positive bus bar, and the second positive bus bar are connected to the inner support housing.

In an embodiment, the high-voltage electronic box assembly includes a junction box housing connected to the high-voltage electronic box, a negative terminal located in the junction box housing, a positive terminal located in the junction box housing, and a plurality of configurations, where the junction box housing is attached to the high-voltage electronic box differently in each of the plurality of configurations. In an embodiment, the negative terminal is connected to the first negative bus bar in a first of the plurality of configurations and a second of the plurality of configurations, and the negative terminal is connected to the second negative bus bar in a third of the plurality of configurations and a fourth of the plurality of configurations, the positive terminal is connected to the first positive bus bar in the first of the plurality of configurations and the second of the plurality of configurations, and the positive terminal is connected to the second positive bus bar in the third of the plurality of configurations and the fourth of the plurality of configurations.

In an embodiment, the negative lead and the positive lead extend out of the junction box housing.

In an embodiment, the high-voltage electronic box assembly includes a first negative bus bar assembly flange being part of the first negative bus bar, a first negative bus bar transition flange integrally formed with the a first negative bus bar assembly flange and is part of first negative bus bar, and a first negative bus bar connector flange integrally formed with the first negative bus bar transition flange and is part of the first negative bus bar. In an embodiment, the high-voltage electronic box assembly includes a second negative bus bar assembly flange being part of the second negative bus bar, the second negative bus bar assembly flange is in contact with the first negative bus bar assembly flange, a second negative bus bar transition flange integrally formed with the second negative bus bar assembly flange and being part of the second negative bus bar, and a second negative bus bar connector flange integrally formed with the second negative bus bar transition flange and being part of the second negative bus bar.

In the first of the plurality of configurations and in the second of the plurality of configurations, the negative terminal is connected to the first negative bus bar connector flange, and in the third of the plurality of configurations and the fourth of the plurality of configurations the negative terminal is connected to the second negative bus bar connector flange.

In an embodiment, a portion of the inner support housing is overmolded around the first negative bus bar transition flange, and another portion of the inner support house is overmolded around the second negative bus bar transition flange. However, it is within the scope of the invention that the inner support housing may be formed using other processes and various materials, and the inner support housing may connected to the first negative bus bar transition flange and the second negative bus bar transition flange using any type of suitable connection.

In an embodiment, the first negative bus bar assembly flange is welded to the second negative bus bar assembly flange such that there is electrical communication between the first negative bus bar and the second negative bus bar. However, it is within the scope of the invention that the first negative bus bar assembly flange may be connected to the second negative bus bar assembly flange using any type of suitable connection.

In an embodiment, the high-voltage electronic box assembly includes a surface treatment on the first negative bus bar assembly flange and the second negative bus bar assembly flange, and the portion of the first negative bus bar assembly flange having the surface treatment is in contact with the portion of the second negative bus bar assembly flange having the surface treatment.

In an embodiment, an aperture is formed as part of the first negative bus bar assembly flange, and an aperture is formed as part of the second negative bus bar assembly flange. A fastener is inserted through the aperture formed as part of the first negative bus bar assembly flange and the aperture formed as part of the second negative bus bar assembly flange and an aperture formed as part of the negative lead to connect the negative lead to the first negative bus bar and the second negative bus bar.

In an embodiment, the high-voltage electronic box assembly includes a first positive bus bar assembly flange being part of the first positive bus bar, a first positive bus bar transition flange integrally formed with the first positive bus bar assembly flange and is part of first positive bus bar, and a first positive bus bar connector flange integrally formed with the first positive bus bar transition flange and is part of first positive bus bar. In an embodiment, the high-voltage electronic box assembly includes a second positive bus bar transition flange integrally formed with the first positive bus bar assembly flange, the second positive bus bar transition flange being part of the first positive bus bar, and a second positive bus bar connector flange integrally formed with the second positive bus bar transition flange, and is part of the first positive bus bar.

In an embodiment, the high-voltage electronic box assembly includes a second positive bus bar assembly flange being part of the second positive bus bar, the second positive bus bar assembly flange is in contact with and in electrical connection with the first positive bus bar assembly flange. In an embodiment, the high-voltage electronic box assembly includes a third positive bus bar transition flange integrally formed with the second positive bus bar assembly flange, and is part of the second positive bus bar, and a third positive bus bar connector flange integrally formed with the third positive bus bar transition flange and is part of second positive bus bar, a fourth positive bus bar transition flange integrally formed with the second positive bus bar assembly flange, and is part of the second positive bus bar, and a fourth positive bus bar connector flange integrally formed with the second positive bus bar assembly flange, and is part of second positive bus bar.

In an embodiment, in the first of the plurality of configurations, the positive terminal is connected to the first positive bus bar connector flange, and in the second of the plurality of configurations, the positive terminal is connected to the second positive bus bar connector flange, and in the third of the plurality of configurations the positive terminal is connected to the third positive bus bar connector flange, and in the fourth of the plurality of configurations, the positive terminal is connected to the fourth positive bus bar connector flange.

In an embodiment, a first portion of the inner support housing is overmolded around the first positive bus bar transition flange, a second portion of the inner support housing is overmolded around the second positive bus bar transition flange, a third portion of the inner support housing is overmolded around the third positive bus bar transition flange, and a fourth portion of the inner support housing is overmolded around the fourth positive bus bar transition flange. However, it is within the scope of the invention that the inner support housing may connected to the first positive bus bar transition flange, the second positive bus bar transition flange, the third positive bus bar transition flange, and the fourth positive bus bar transition flange using any type of suitable connection.

In an embodiment, the first positive bus bar assembly flange is welded to the second positive bus bar assembly flange such that there is electrical communication between the first positive bus bar and the second positive bus bar. However, it is within the scope of the invention that the first positive bus bar assembly flange may be connected to the second positive bus bar assembly flange using any type of suitable connection.

In an embodiment, the high-voltage electronic box assembly includes a surface treatment on the first positive bus bar assembly flange and the second positive bus bar assembly flange, and the portion of the first positive bus bar assembly flange having the surface treatment is in contact with the portion of the second positive bus bar assembly flange having the surface treatment.

In an embodiment, an aperture is formed as part of the first positive bus bar assembly flange, and an aperture is formed as part of the second positive bus bar assembly flange. A fastener is inserted through the aperture formed as part of the first positive bus bar assembly flange and the aperture formed as part of the second positive bus bar assembly flange and an aperture formed as part of the positive lead to connect the positive lead to the first positive bus bar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
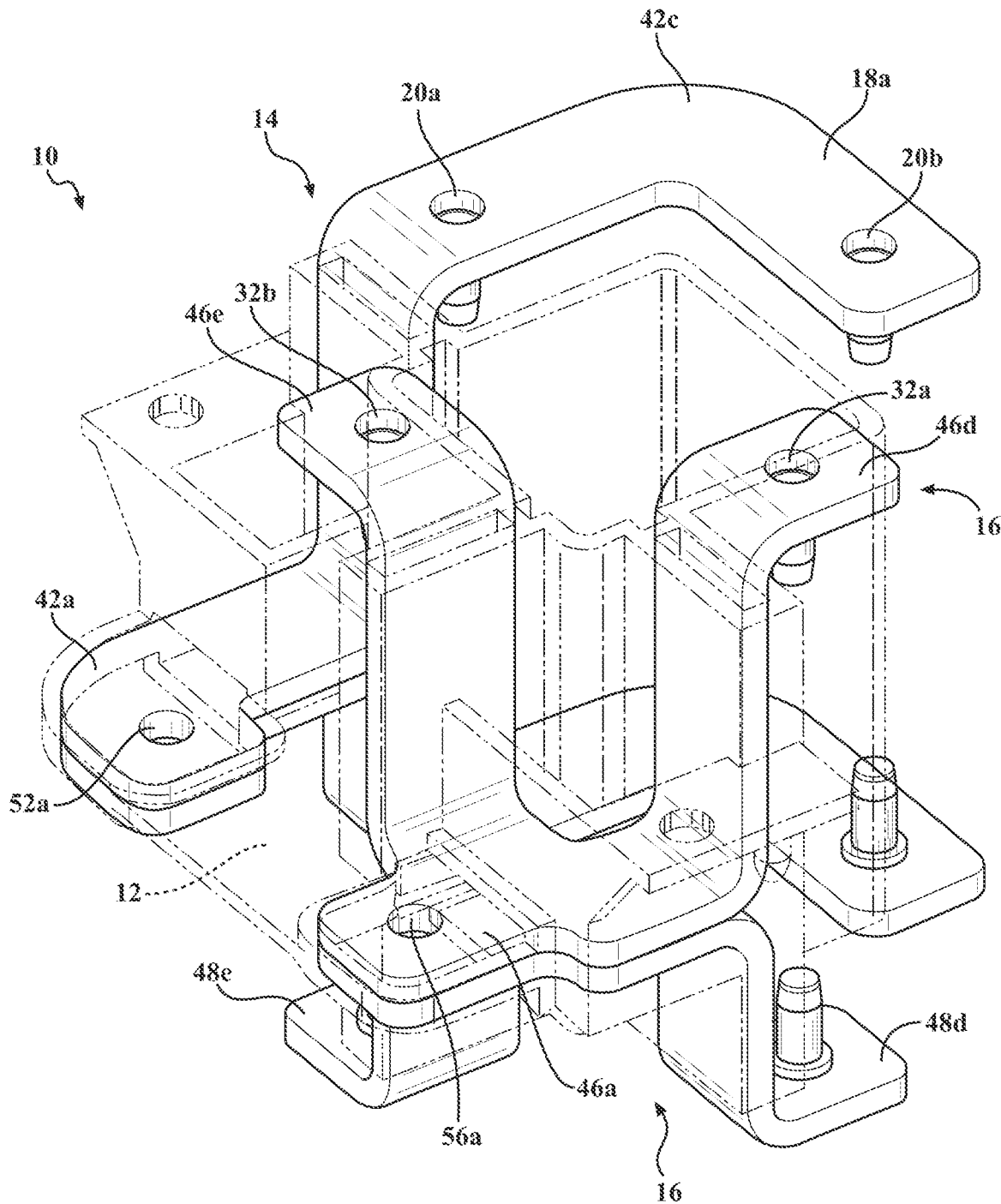
FIG. 1A is first perspective view of a multi-directional connector assembly, according to embodiments of the present invention.
Figure 1B:
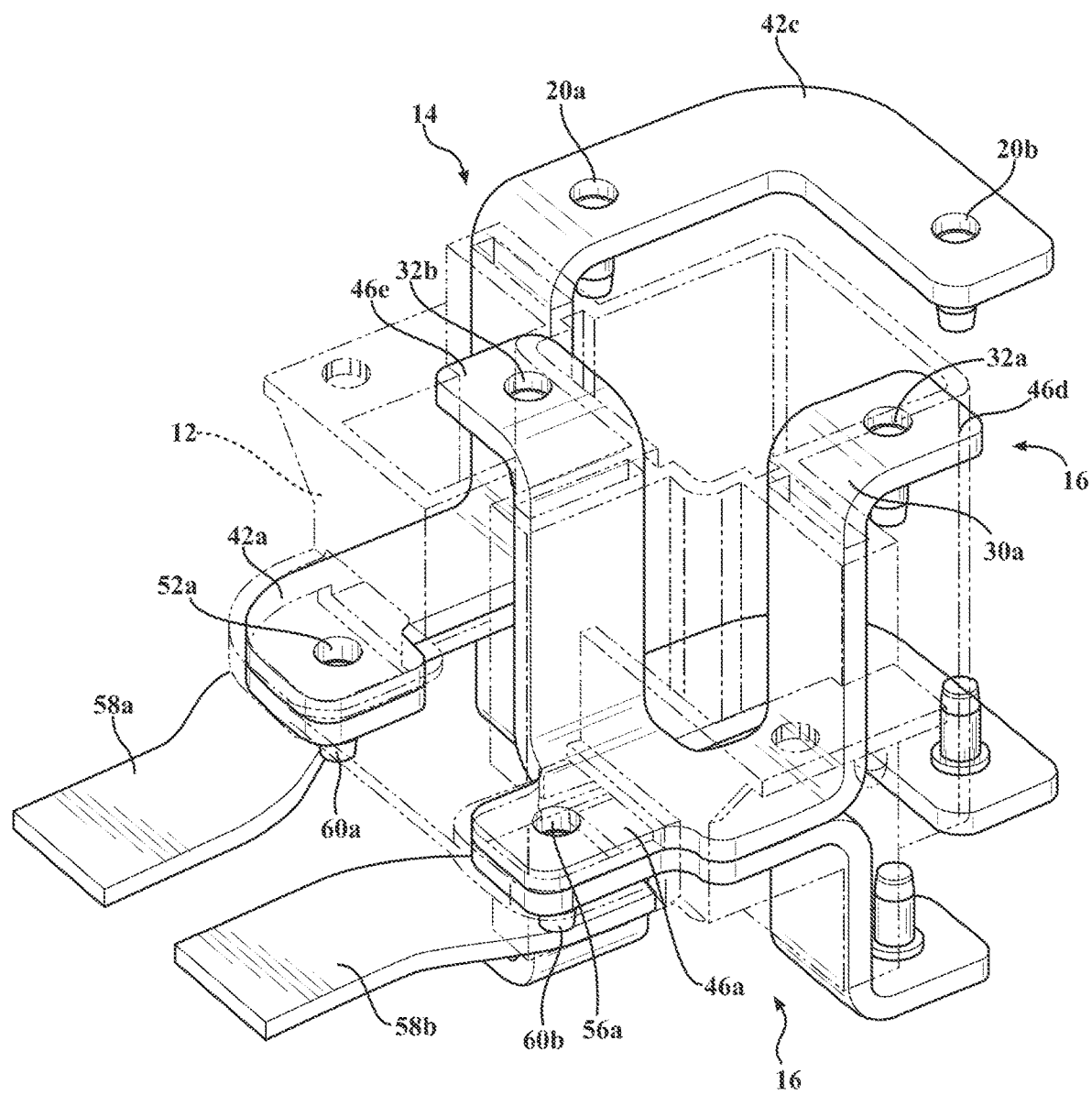
FIG. 1B is a second perspective view of a multi-directional connector assembly connected to negative lead and a positive lead, according to embodiments of the present invention.

The following description of the preferred embodiment(s) is merely exemplary in nature and is in no way intended to limit the invention, its application, or uses.

A multi-directional connector assembly according to the present invention is shown in FIGS. 1A-1D generally at 10. The connector assembly 10 includes an inner support housing 12 and connected to the inner support housing 12 is a negative bus bar assembly, shown generally at 14, and a positive bus bar assembly, shown generally at 16.

The negative bus bar assembly 14 includes a first negative bus bar 18a and a second negative bus bar 18b. There is a first assembly aperture 20a and a second assembly aperture 20b formed as part of the first negative bus bar 18a, and a third assembly aperture 20c and a fourth assembly aperture 20d are integrally formed as part of the second negative bus bar 18b. Connected to the first negative bus bar 18a are connection features 22a,22b, and each of the connection features 22a,22b is press-fit into a corresponding assembly aperture 20a,20b, shown in FIGS. 1A,1B. More specifically, each of the connection features 22a,22b is generally cylindrical in shape, and includes a corresponding flange portion 24a,24b, which is pressed into a corresponding assembly aperture 20a,20b until a corresponding outer flange 26a,26b contacts the first bus bar 16a. Each of the connection features 22a,22b also has an internal threaded surface 28a, 28b, which is used for connection with a fastener, such as a screw.

Connected to the second negative bus bar 18b are corresponding connection features 22c,22d, and similar to the connection features 22a,22b, each of the connection features 22c,22d is generally cylindrical in shape, and has corresponding flange portions 24c,24d, outer flanges 26c,26d, and internal threaded surfaces (not shown), and the connection features 22c,22d are connected to the second negative bus bar 18b in the same manner that the connection features 22a,22b are connected to the first negative bus bar 18a. The internal threaded surfaces are suitable for connection with a fastener.

Figure 1C:
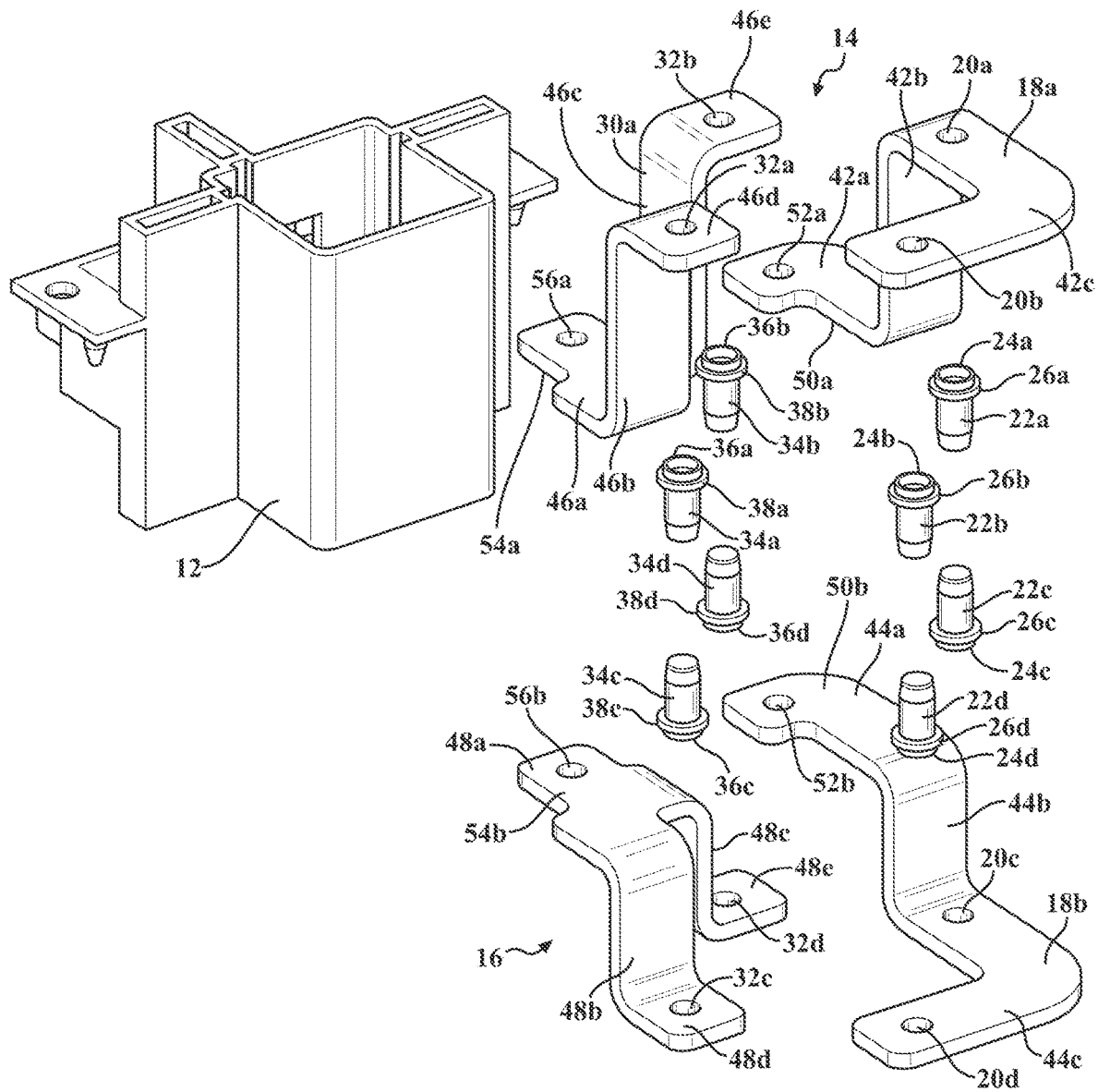
FIG. 1C is a first exploded view of several components which are part of a multi-directional connector assembly, according to embodiments of the present invention.
Figure 1D:
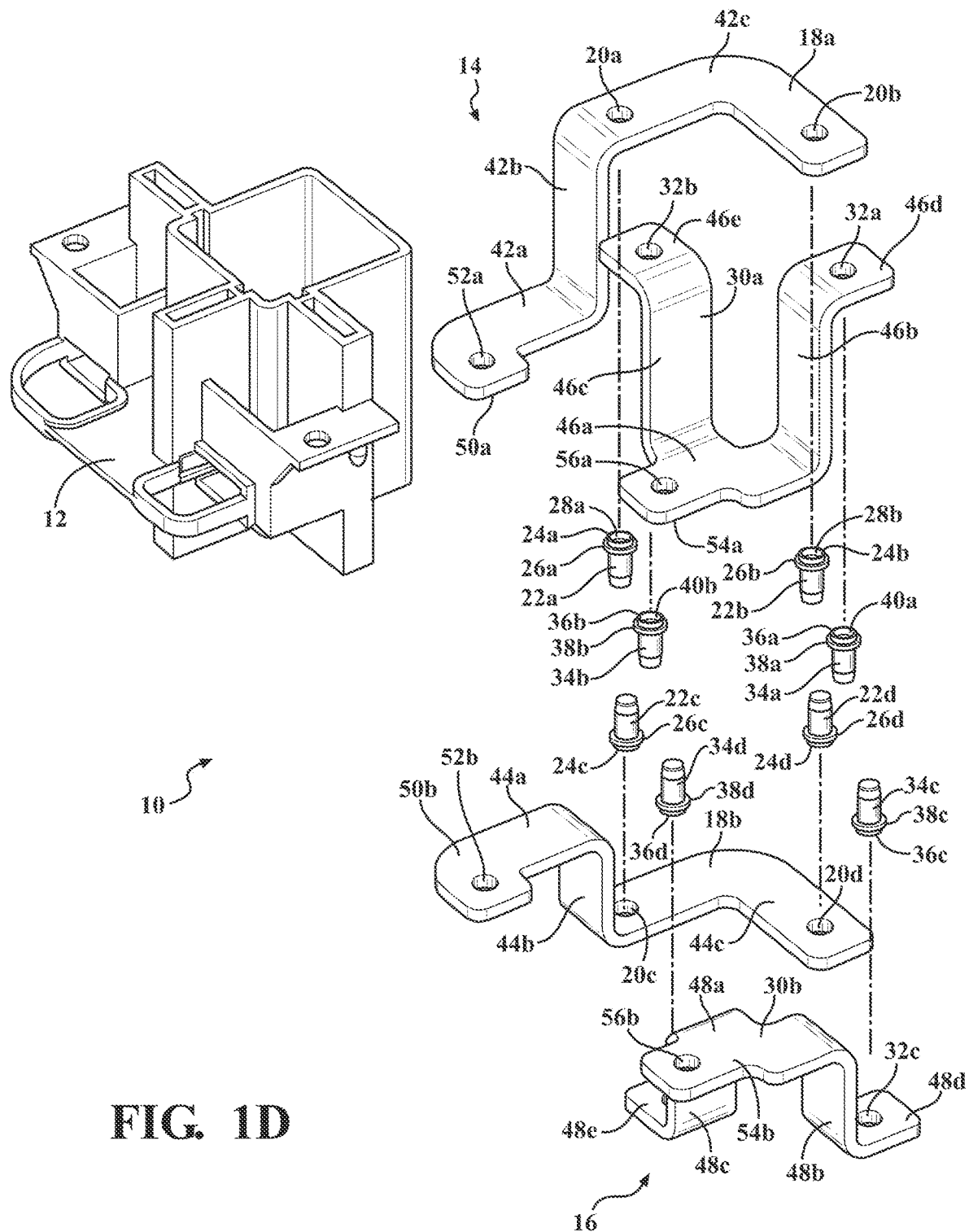
FIG. 1D is a second exploded view of several components which are part of a multi-directional connector assembly, according to embodiments of the present invention.
Figure 1E:
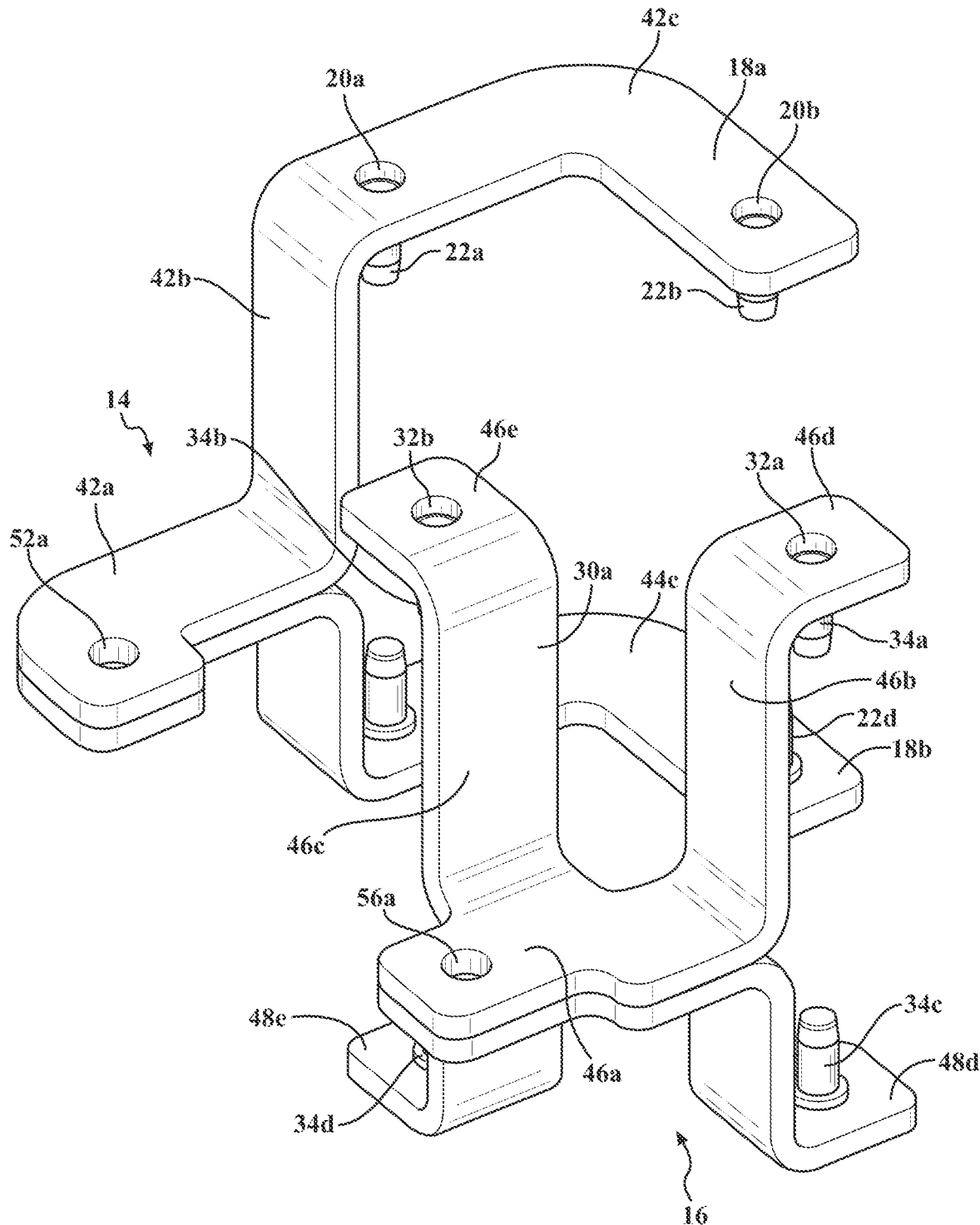
FIG. 1E is a perspective view of a negative bus bar assembly and a positive bus bar assembly, which are part of a multi-directional connector assembly, according to embodiments of the present invention.
Figure 2A:
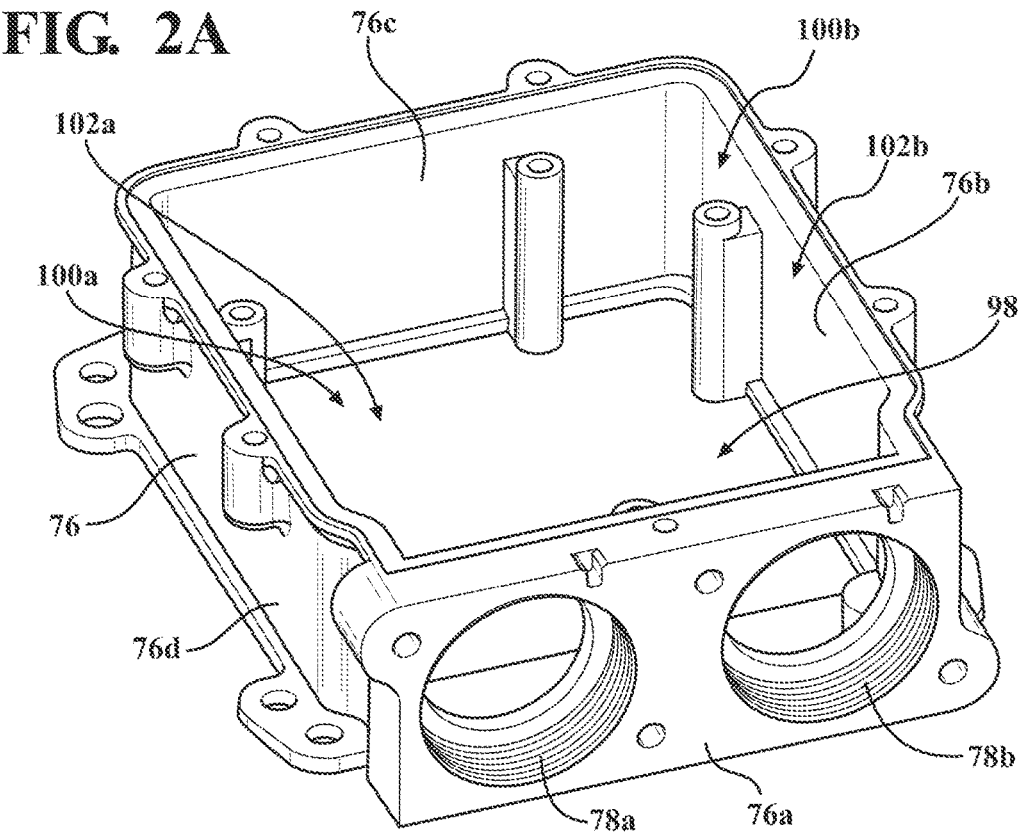
FIG. 2A is a perspective view of a junction box housing which is part of a high-voltage electronic box assembly, according to embodiments of the present invention.
Figure 2B:
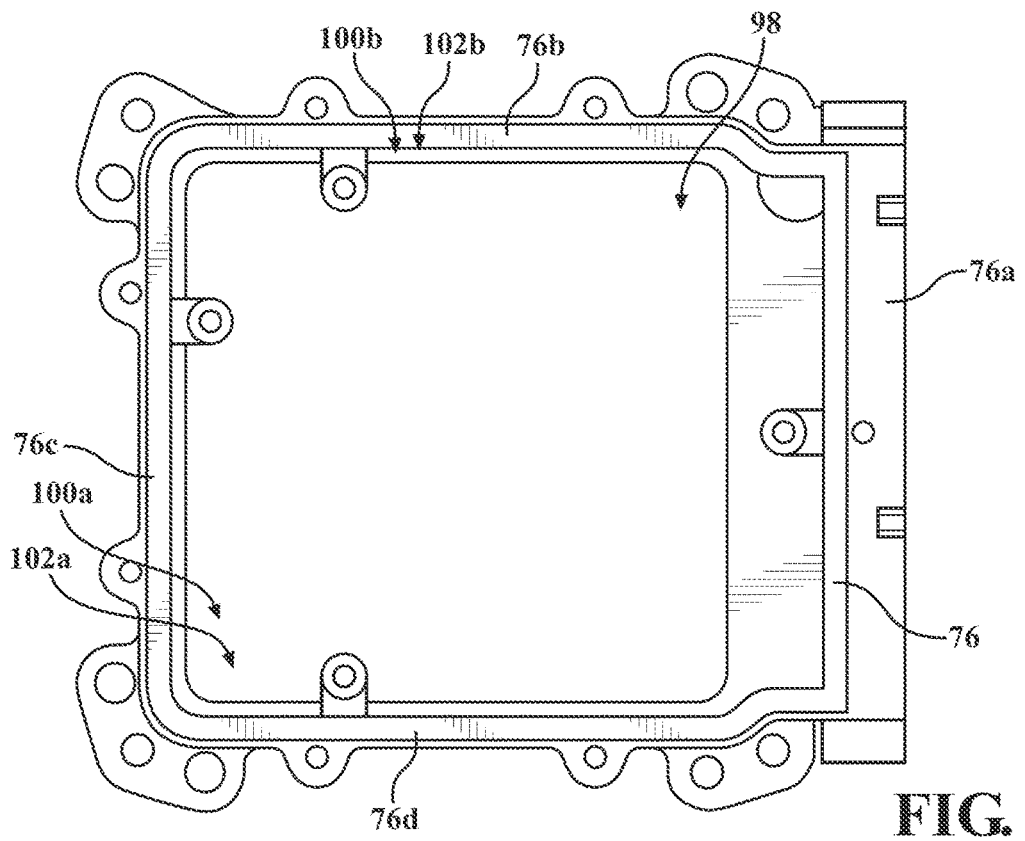
FIG. 2B is a top view of a junction box housing which is part of a high-voltage electronic box assembly, according to embodiments of the present invention.
Figure 3A:
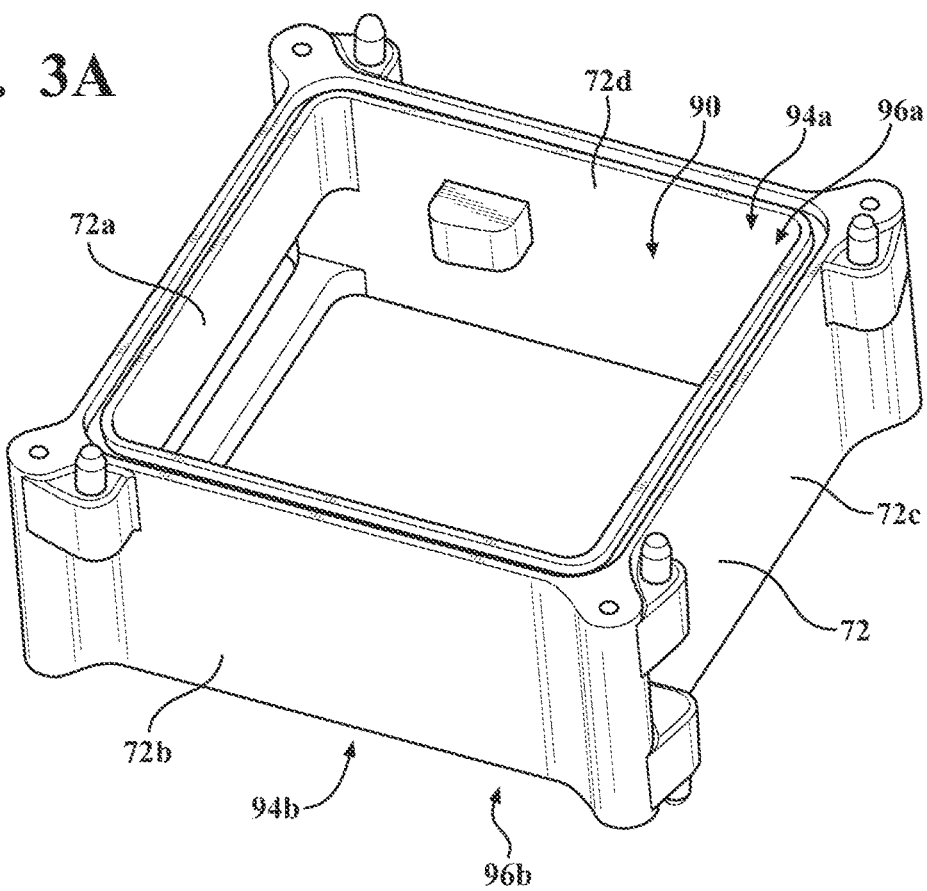
FIG. 3A is a perspective view of a high-voltage electronic box which is part of a high-voltage electronic box assembly, according to embodiments of the present invention.
Figure 3B:
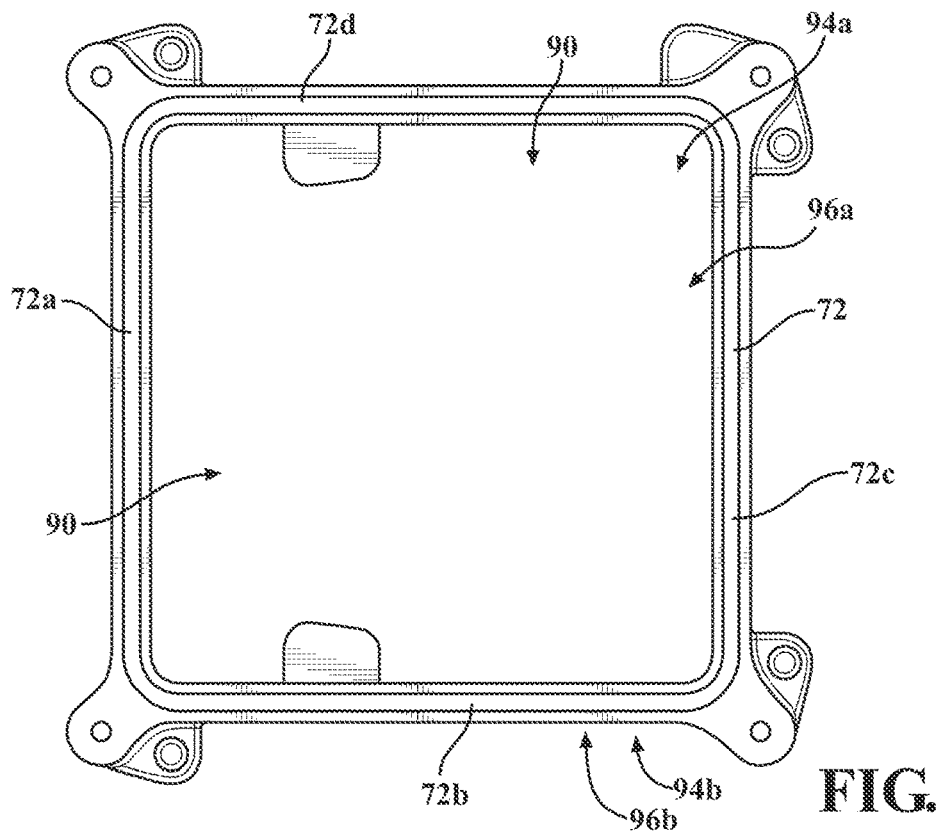
FIG. 3B is a top view of a high-voltage electronic box which is part of a high-voltage electronic box assembly, according to embodiments of the present invention.

The positive bus bar assembly 16 includes a first positive bus bar 30a and a second positive bus bar 30b. There is a first assembly aperture 32a and a second assembly aperture 32b formed as part of the first positive bus bar 30a, and a third assembly aperture 32c and a fourth assembly aperture 32d are formed as part of the second positive bus bar 30b. The positive bus bar assembly 16 also includes connection features 34a,34b,34c,34d, which are generally cylindrical in shape, and each of the connection features 34a,34b,34c,34d includes corresponding flange portions 36a,36b,36c,36d, outer flanges 38a,38b,38c,38d, and internal threaded surfaces 40a,40b (two are shown in FIGS. 1C and 1D). The connection features 34a,34b are connected to the first positive bus bar 30a in the manner described above, and the connection features 34c,34d are connected to the second positive bus bar 30b in the manner described above.

In alternate embodiments, the negative bus bars 18a,18b and/or the positive bus bars 30a,30b could be formed as a single component, and made using various manufacturing processes.

The first negative bus bar 18a of the negative bus bar assembly 14 includes a first negative bus bar assembly flange 42a, a first negative bus bar transition flange 42b, and a first negative bus bar connector flange 42c, and the second negative bus bar 18b also includes a second negative bus bar assembly flange 44a, a second negative bus bar transition flange 44b, and a second negative bus bar connector flange 44c.

The first positive bus bar 30a of the positive bus bar assembly 16 includes a first positive bus bar assembly flange 46a integrally formed with a first positive bus bar transition flange 46b and a second positive bus bar transition flange 46c. A first positive bus bar connector flange 46d is integrally formed with the first positive bus bar transition flange 46b, and a second positive bus bar connector flange 46e is integrally formed with the second positive bus bar transition flange 46c. The second positive bus bar 30b includes a second positive bus bar assembly flange 48a integrally formed with a third positive bus bar transition flange 48b and a fourth positive bus bar transition flange 48c. A third positive bus bar connector flange 48d is integrally formed with the third positive bus bar transition flange 48b, and a fourth positive bus bar connector flange 48e is integrally formed with the fourth positive bus bar transition flange 48c.

The first negative bus bar connector flange 42c, the first positive bus bar connector flange 46d, and the second positive bus bar connector flange 46e are located and aligned in a first plane. Also, the first negative bus bar connector flange 42c, the first positive bus bar connector flange 46d, and the second positive bus bar connector flange 46e are all parallel to the first negative bus bar assembly flange 42a and first positive bus bar assembly flange 46a. The first negative bus bar connector flange 42c, the first positive bus bar connector flange 46d, and the second positive bus bar connector flange 46e are all perpendicular to the first negative bus bar transition flange 42b, the first positive bus bar transition flange 46b, and a second positive bus bar transition flange 46c. Additionally, the second negative bus bar connector flange 44c, third positive bus bar connector flange 48d, and the fourth positive bus bar connector flange 48e are located and aligned in a second plane. The second negative bus bar connector flange 44c, third positive bus bar connector flange 48d, and the fourth positive bus bar connector flange 48e are all parallel to the second negative bus bar assembly flange 44a and the second positive bus bar assembly flange 48a. Also, the second negative bus bar connector flange 44c, third positive bus bar connector flange 48d, and the fourth positive bus bar connector flange 48e are perpendicular to the second negative bus bar transition flange 44b, the third positive bus bar transition flange 48b, and the fourth positive bus bar transition flange 48c. However, it is within the scope of the invention that the various flanges may be configured to have different angles relative to one another.

During assembly, the first negative bus bar 18a and the second negative bus bar 18b of the negative bus bar assembly 14 are positioned such that a first contact surface 50a of the first negative bus bar assembly flange 42a is in contact with a second contact surface 50b of the second negative bus bar assembly flange 44a, such that a fastening aperture 52a integrally formed as part of the first negative bus bar assembly flange 42a is in alignment with a fastening aperture 52b integrally formed as part of the second negative bus bar assembly flange 44a. Also, the first positive bus bar 30a and the second positive bus bar 30b of the positive bus bar assembly 16 are positioned such that a first contact surface 54a of the first positive bus bar assembly flange 46a is in contact with a second contact surface 54b of the second positive bus bar assembly flange 48a, such that a fastening aperture 56a integrally formed as part of the first positive bus bar assembly flange 46a is in alignment with a fastening aperture 56b integrally formed as part of the second positive bus bar assembly flange 48a.

Once the first contact surface 50a is in contact with the second contact surface 50b, the first negative bus bar assembly flange 42a is welded to the second negative bus bar assembly flange 44a, connecting the first negative bus bar 18a to the second negative bus bar 18b, such that there is electrical communication (i.e., current is able to flow) between the first negative bus bar 18a and the second negative bus bar 18b. Also, once the first contact surface 54a is in contact with a second contact surface 54b, the first positive bus bar assembly flange 46a is welded to the second positive bus bar assembly flange 48a, connecting the first positive bus bar 30a to the second positive bus bar 30b, such that there is electrical communication (i.e., current is able to flow) between the first positive bus bar 30a and the second positive bus bar 30b.

Once the first negative bus bar 18a is connected to the second negative bus bar 18b and the first positive bus bar 30a is connected to the second positive bus bar 30b, the inner support housing 12 is formed. In an embodiment, the inner support housing 12 is formed by an overmolding process, but it is within the scope of the invention that the inner support housing 12 may be formed using other processes and various materials. In the embodiment shown, the inner support housing 12 is formed such that a portion of the inner support housing 12 surrounds the transition flanges 42b,44b of the negative bus bars 18a,18b, and other portions of the inner support housing 12 surround the transition flanges 46b,48b,46c,48c of the positive bus bars 30a,30b, respectively, such that the negative bus bars 18a,18b and the positive bus bars 30a,30b are connected together along with the inner support housing 12 as shown in FIGS. 1A, 1B and 4A-7B, to form the connector assembly 10.

Once the connector assembly 10 is complete, a negative lead 58a is placed in contact with the second negative bus bar assembly flange 44a on the opposite side of the second negative bus bar assembly flange 44a as the contact surface 50b, and a positive lead 58b is placed in contact with the assembly flange 48a on the opposite side of the assembly flange 48a as the contact surface 54b, as shown in FIGS. 1B and 4A-7B. Each of the leads 58a,58b includes a connection feature 60a,60b, where each connection feature 60a,60b is connected to a corresponding lead 58a,58b, in the same manner that the connection features 22a,22b,22c,22d are connected to the first negative bus bar 18a and the second negative bus bar 18b, respectively, as previously described.

To connect the lead 58a to the assembly flanges 42a,44a, after the negative lead 58a is placed in contact with the second negative bus bar assembly flange 44a as previously mentioned, a fastener, which in this embodiment is a screw 62a, is inserted through the fastening apertures 52a,52b and through an aperture (not shown) of the negative lead 58a, and into the connection feature 60a, securing the lead 58a to the assembly flanges 42a,44a. To connect the lead 58b to the assembly flanges 46a,48a, after the positive lead 58b is placed in contact with the assembly flange 48a as previously mentioned, another screw 62b is inserted through the fastening apertures 56a,56b and through an aperture (not shown) of the positive lead 58b, and into the connection feature 60b, securing the lead 58b to the assembly flanges 46a,48a. The leads 58a,58b are connected to other components (now shown) in an HV electronic box.

Terminals for an HV battery may be connected to the connector flanges 42c,44c of the negative bus bar assembly 14 and the connector flanges 46d,46e,48d,48e of the positive bus bar assembly 16 in multiple configurations. There is a negative terminal 64a and a positive terminal 64b which are connected to the bus bar assemblies 14,16 in various configurations, where a portion of the terminals 64a,64b is shown in FIGS. 46,56,66,7B. Each of the terminals 64a,64b includes a corresponding flange portion 66a,66b having an aperture (not shown) and fasteners, which in this embodiment are screws 70a,70b.

Referring to FIGS. 4A, 5A, 6A, and 7A, the multi-directional connector assembly 10 is located in a high-voltage (HV) electronic box 72, a portion of which is shown. The HV electronic box 72 has four sidewalls 72a,72b,72c,72d which surround a cavity, shown generally at 90, where the multi-directional connector assembly 10 is located in the cavity 90. Because there are only four sidewalls 72a,72b,72c,72d, the HV electronic box 72 also includes a first opening, shown generally at 94a, on a first side, shown generally at 96a, and a second opening, shown generally at 94b, on a second side, shown generally at 96b. The terminals 64a,64b are located in a junction box housing 76, and the terminals 64a,64b are connected to a negative battery terminal 74a and a positive battery terminal 74b, respectively, through apertures in a sidewall 76a of the junction box housing 76. The battery terminals 74a,74b are mounted in the apertures in the sidewall 76a of the junction box housing 76. The junction box housing 76 also has other sidewalls 76b,76c,76d connected as shown in FIGS. 2A,2B and 4A, 5A, 6A, and 7A. The junction box housing 76 only has four sidewalls 76a,76b,76c,76d, which surround a cavity, shown generally at 98, where the terminals 64a,64b and part of the battery terminals 74a74b are located in the cavity 98. Because there is only four sidewalls 76a,76b,76c,76d, the junction box housing 76 has includes a first opening, shown generally at 100a, on a first side, shown generally at 102a, and a second opening, shown generally at 100b, on a second side, shown generally at 102b.

The sidewall 76a has threaded apertures 78a,78b, and each of the battery terminals 74a,74b has a corresponding threaded surface 80a,80b, where the threaded surfaces 80a,80b of the battery terminals 74a,74b are engaged with the threaded apertures 78a,78b, respectively. Each of the battery terminals 74a,74b also includes a corresponding attachment flange 82a,82b (shown in FIG. 7A), where screws are inserted through apertures 84 of the attachment flanges 82a,82b to connect the battery terminals 74a,74b to the sidewall 76a. The terminals 64a,64b and battery terminals 74a,74b are connected to the junction box housing 76 form a junction box assembly, shown generally at 92. The junction box housing 76 is connected to the HV electronic box 72 on either the first side 96a of the HV electronic box 72, or the second side 96b of the HV electronic box 72, depending upon the configuration of the junction box assembly 92. The junction box assembly 92, the HV electronic box 72, and the multi-directional connector assembly 10 form a high-voltage electronic box assembly. Also included is a cover 104, which is connected to the HV electronic box 72 on the opposite side of the HV electronic box 72 in relation to the junction box housing 76.

A negative cable connector 86*a* is connected to the negative battery terminal 74*a* and a positive cable connector 86*b* is connected to the positive battery terminal 74*b*. A negative cable 88*a* is connected to and extends away from the negative cable connector 86*a*, and a positive cable 88*b* is connected to an extends away from the positive cable connector 86*b*.

Figure 4A:
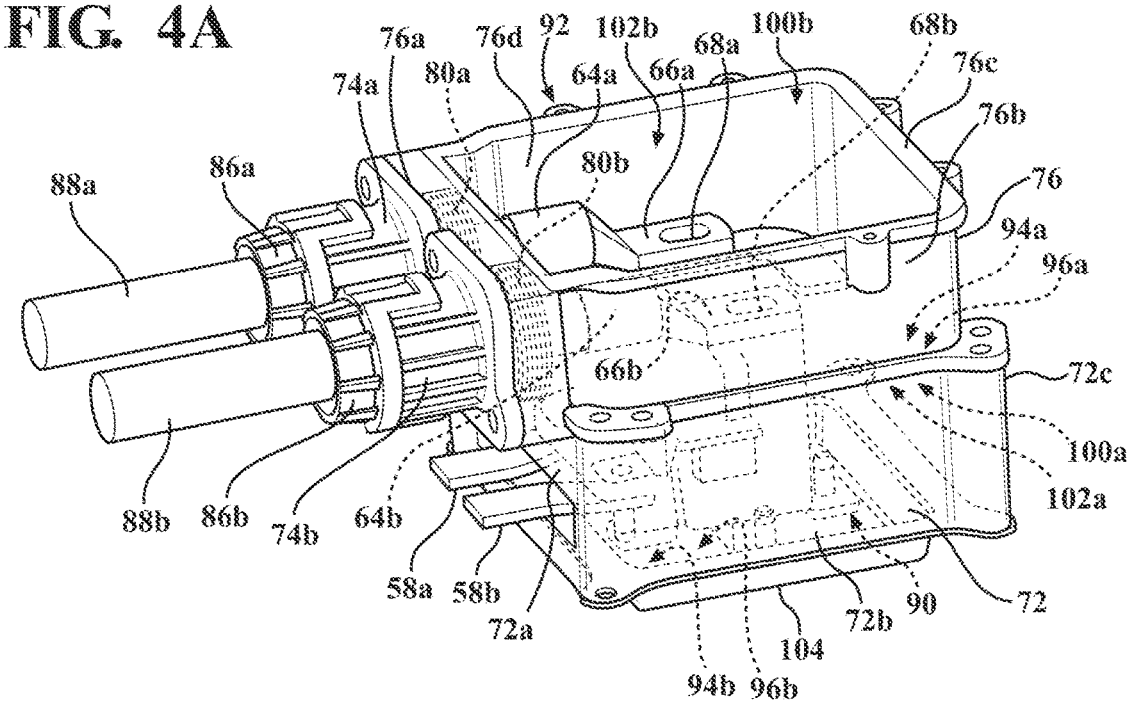
FIG. 4A is a perspective view of a high-voltage electronic box assembly in a first configuration, according to embodiments of the present invention.
Figure 4B:
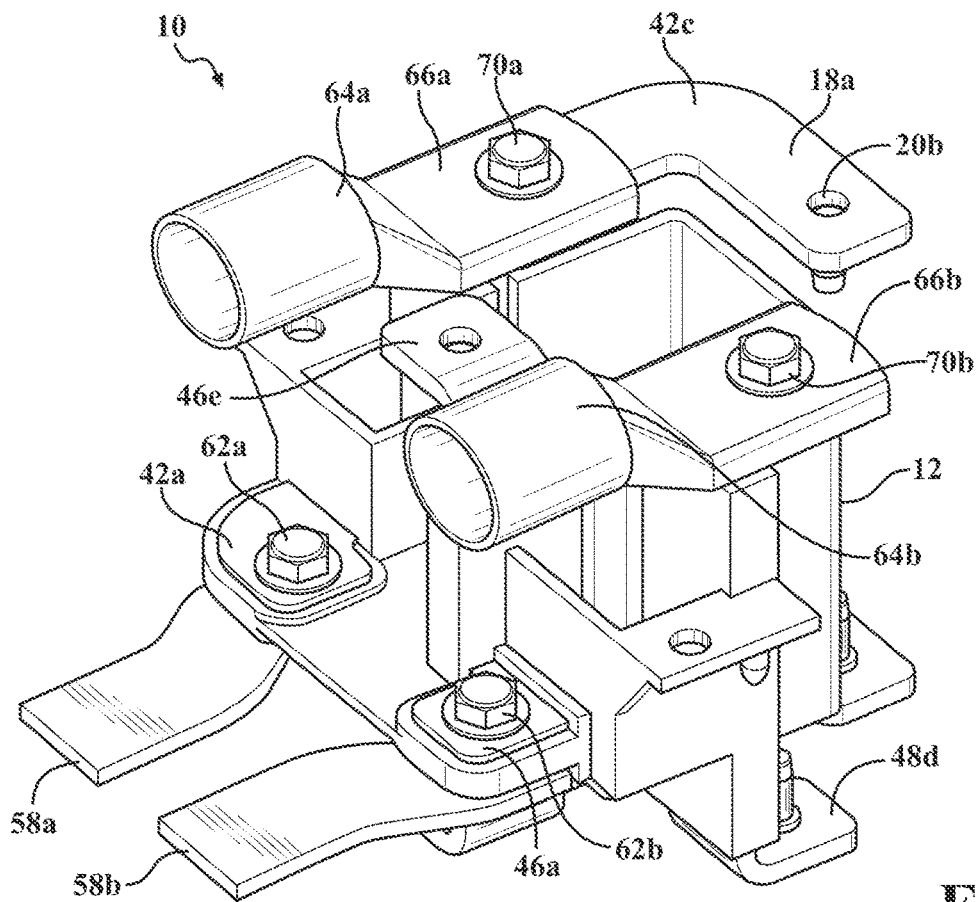
FIG. 4B is a perspective view of a multi-directional connector assembly in a first configuration, according to embodiments of the present invention.

Referring now to FIGS. 4A-4B, the multi-directional connector assembly 10, the HV electronic box 72, and the junction box assembly 92 are placed in a 0° configuration, or first configuration. In this configuration, the junction box assembly 92 is connected to the HV electronic box 72 such that the first side 96*a* of the HV electronic box 72 is connected to the first side 102*a* of the junction box housing 76, and the aperture 94*a* of the HV electronic box 72 is aligned with the aperture 100*a* of the junction box housing 76. In the first configuration, the negative terminal 64*a* is connected to the first negative bus bar connector flange 42*c* of the first negative bus bar 18*a* by inserting the screw 70*a* through the aperture 68*a* of the flange portion 66*a*, through the assembly aperture 20*a* and into the connection feature 22*a*. The positive terminal 64*b* is connected to the connector flange 46*d* of the first positive bus bar 30*a* by inserting the screw 70*b* through the aperture 68*b* of the flange portion 66*b*, through the assembly aperture 32*a* and into the connection feature 34*a*. In the first configuration, terminals 64*a*,64*b* and battery terminals 74*a*74*b*, extend away from the junction box housing 76 in the same direction as the leads 58*a*,58*b* extend away from the HV electronic box 72.

Figure 5A:
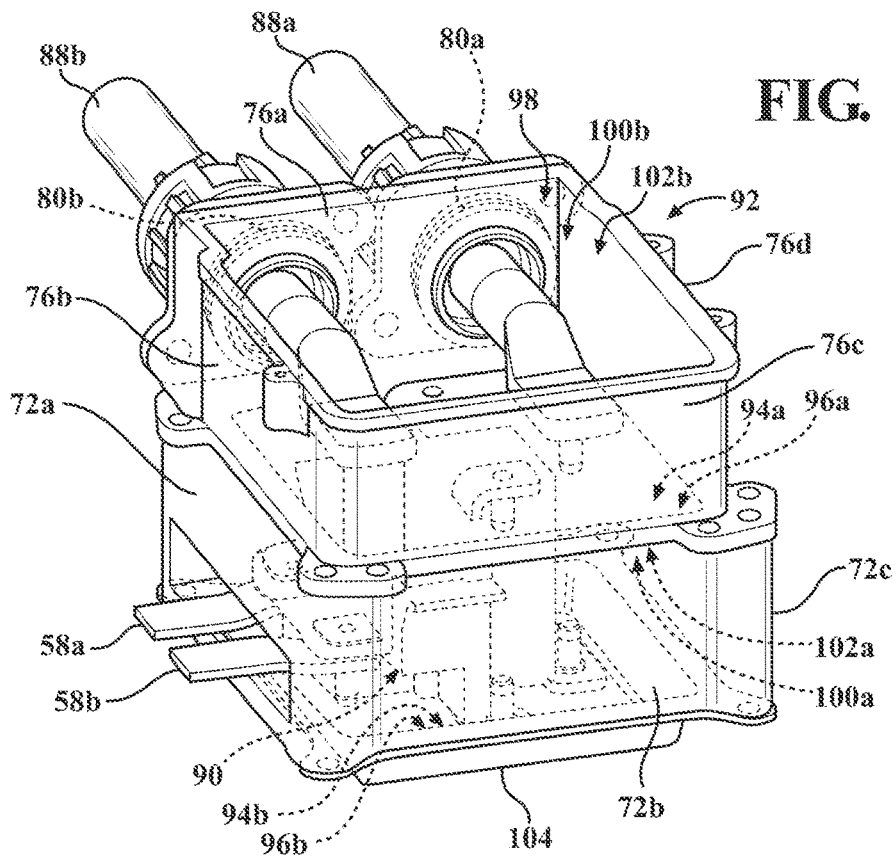
FIG. 5A is a perspective view of a high-voltage electronic box assembly in a second configuration, according to embodiments of the present invention.
Figure 5B:
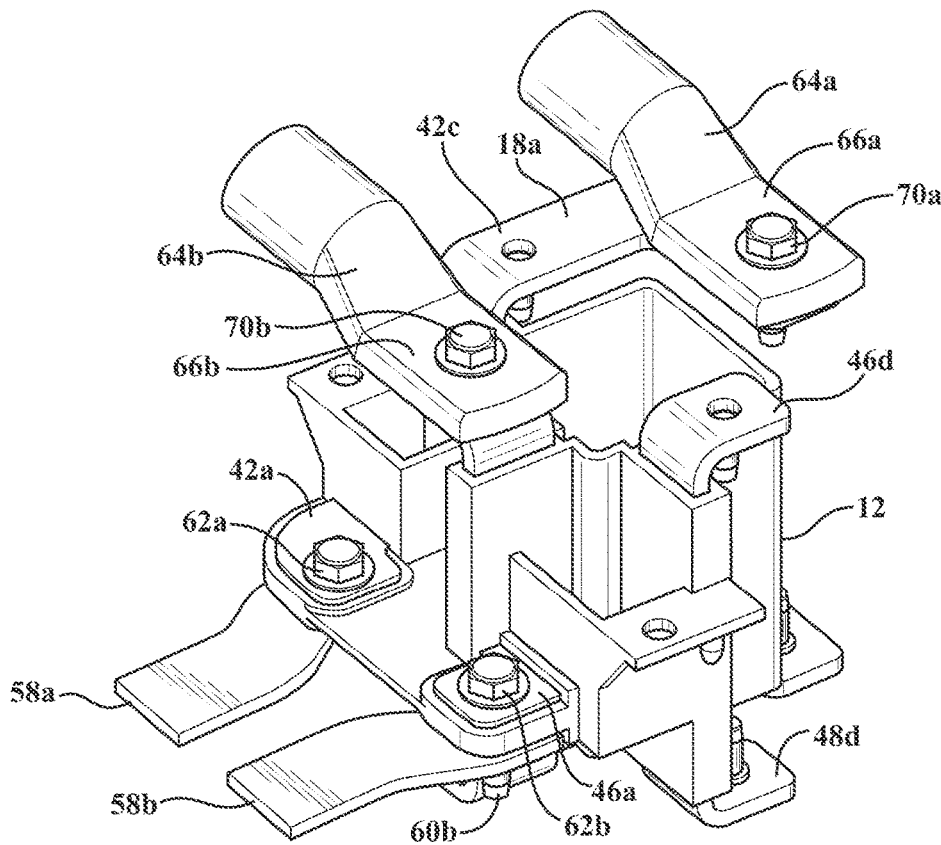
FIG. 5B is a perspective view of a multi-directional connector assembly in a second configuration, according to embodiments of the present invention.

Referring now to FIGS. 5A-5B, the multi-directional connector assembly 10, the HV electronic box 72, and the junction box assembly 92 are placed in a 90° configuration, or a second configuration. In this configuration, the junction box assembly 92 is again connected to the HV electronic box 72 such that the first side 96*a* of the HV electronic box 72 is connected to the first side 102*a* of the junction box housing 76, and the aperture 94*a* of the HV electronic box 72 is aligned with the aperture 100*a* of the junction box housing 76. However, as shown in FIG. 5A, the junction box housing 76 is positioned 90° relative to the position of the junction box housing 76 shown in FIG. 4A. In the second configuration, the negative terminal 64*a* is still connected to the first negative bus bar connector flange 42*c* of the first negative bus bar 18*a*, but the negative terminal 64*a* positioned such that the screw 70*a* is inserted through the aperture 68*a* of the flange portion 66*a*, through the assembly aperture 20*b* and into the connection feature 22*b*. The positive terminal 64*b* in this configuration is connected to the connector flange 46*e* of the first positive bus bar 30*a* by inserting the screw 70*b* through the aperture 68*b* of the flange portion 66*b*, through the assembly aperture 32*b* and into the connection feature 34*b*. In the second configuration, terminals 64*a*,64*b* and battery terminals 74*a*74*b*, extend away from the junction box housing 76 perpendicularly relative to the direction the leads 58*a*,58*b* extend away from the HV electronic box 72.

Also, in both the first configuration and the second configuration, the cover 104 is connected to the second side 96*b* of the HV electronic box 72. The aperture 100*b* of the junction box housing 76 allows for a tool to be used to assemble the screws 70*a*,70*b*, and a second cover (not shown) is then attached to the second side 102*b* of the junction box housing 76.

Figure 6A:
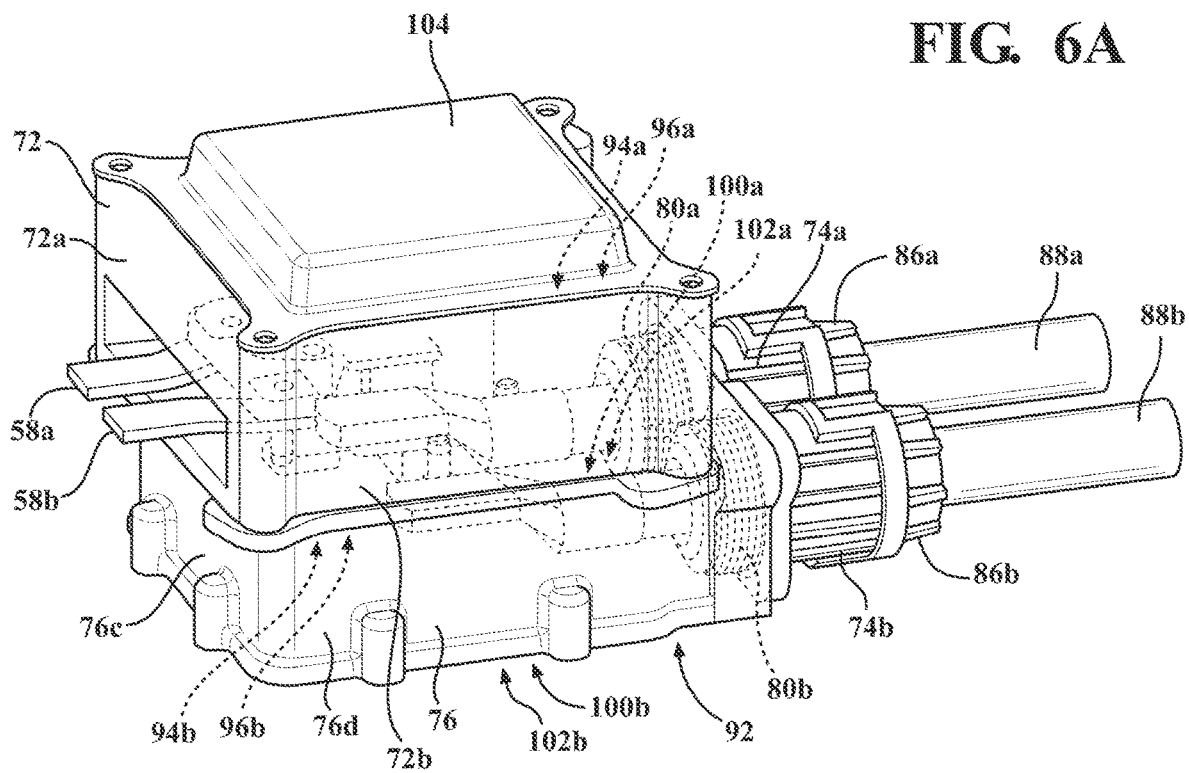
FIG. 6A is a perspective view of a high-voltage electronic box assembly in a third configuration, according to embodiments of the present invention.
Figure 6B:
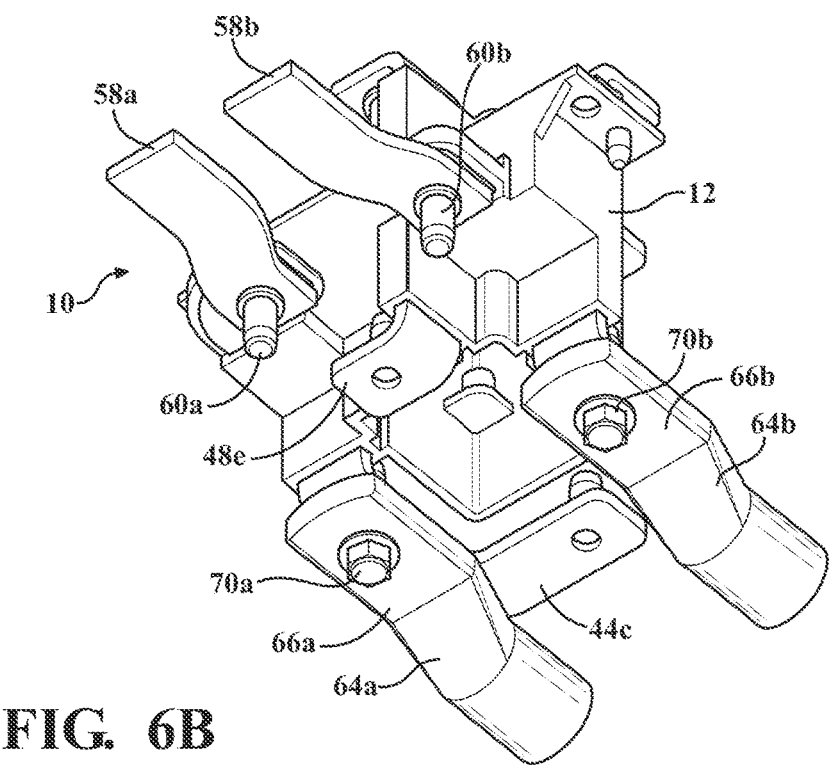
FIG. 6B is a perspective view of a multi-directional connector assembly in a third configuration, according to embodiments of the present invention.

Referring now to FIGS. 6A-6B, the multi-directional connector assembly 10, the HV electronic box 72, and the junction box assembly 92 are placed in a 180° configuration, or a third configuration. In this configuration the junction box assembly 92 is connected to the HV electronic box 72 such that the second side 96*b* of the HV electronic box 72 is connected to the first side 102*a* of the junction box housing 76, and the aperture 94*b* of the HV electronic box 72 is aligned with the aperture 100*a* of the junction box housing 76. Also, as shown in FIG. 6A, the junction box housing 76 is rotated 180° relative to the position of the junction box housing 76 shown in FIG. 4A. In the third configuration, the negative terminal 64*a* is connected to the second negative bus bar connector flange 44*c* of the second negative bus bar 18*b*, by inserting the screw 70*a* through the aperture 68*a* of the flange portion 66*a*, through the assembly aperture 20*c* and into the connection feature 22*c*. The positive terminal 64*b* in this configuration is connected to the connector flange 48*d* of the second positive bus bar 30*b* by inserting the screw 70*b* through the aperture 68*b* of the flange portion 66*b*, through the assembly aperture 32*c* and into the connection feature 34*c*. In the third configuration, terminals 64*a*,64*b* and battery terminals 74*a*74*b*, extend away from the junction box housing 76 in the opposite direction as the leads 58*a*,58*b* extend away from the HV electronic box 72.

Figure 7A:
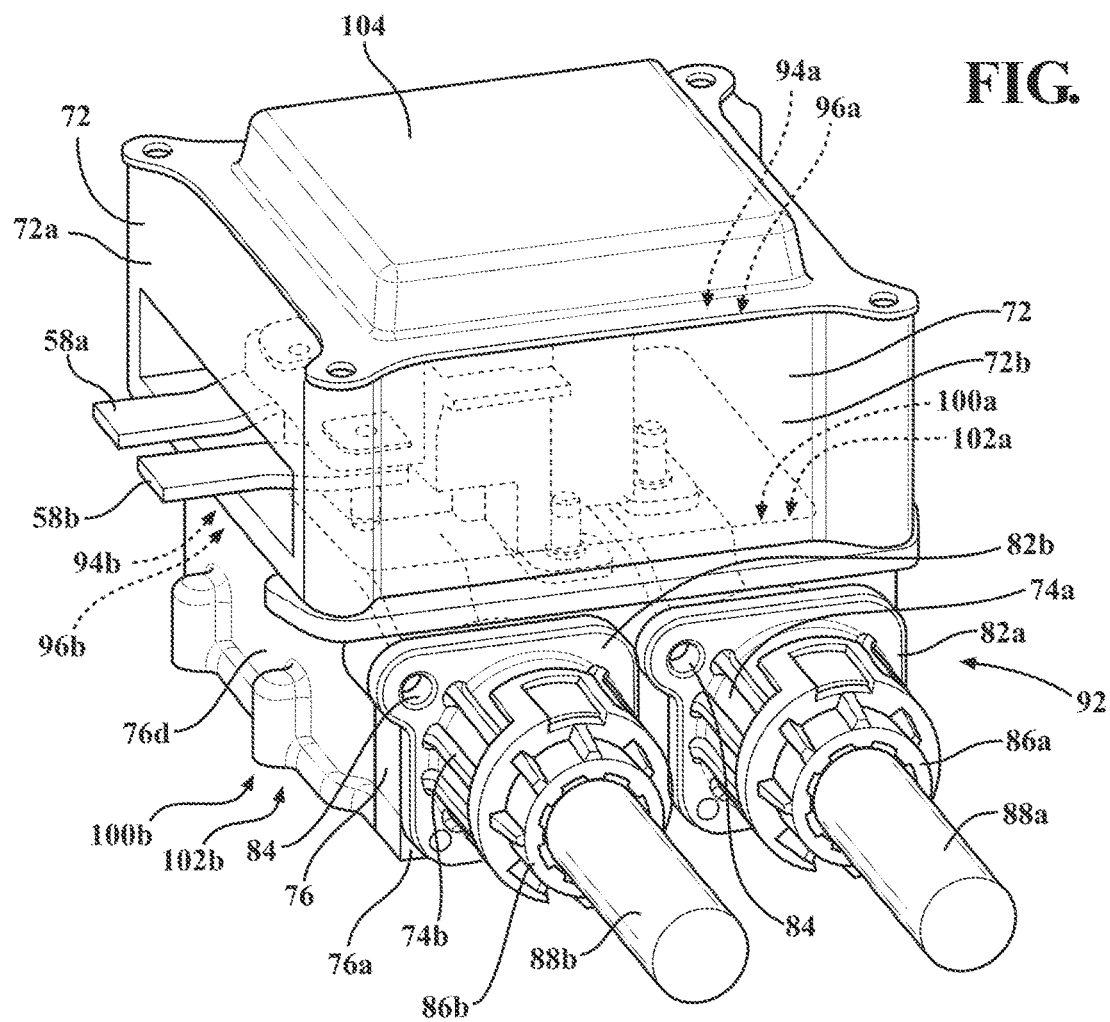
FIG. 7A is a perspective view of a high-voltage electronic box assembly in a fourth configuration, according to embodiments of the present invention.
Figure 7B:
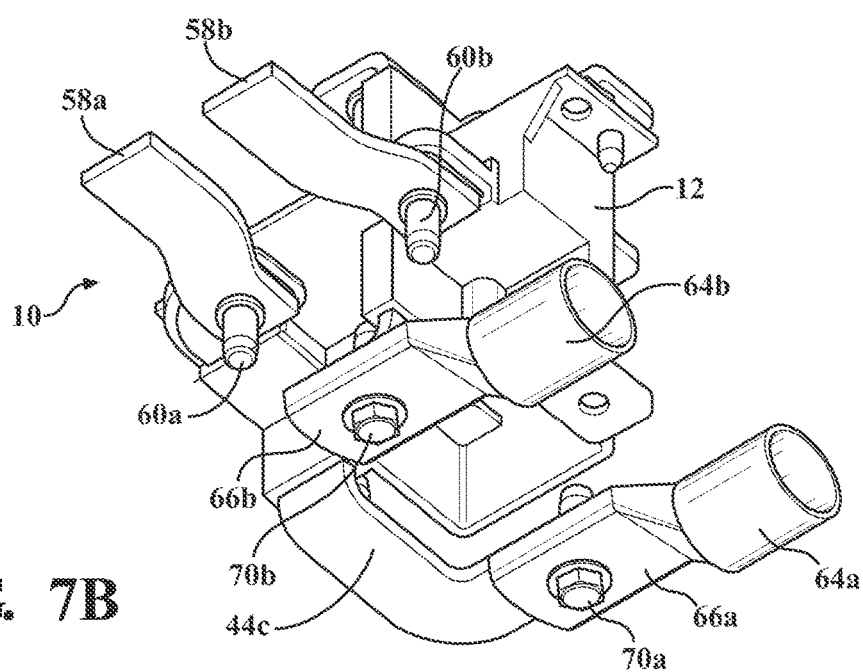
FIG. 7B is a perspective view of a multi-directional connector assembly in a fourth configuration, according to embodiments of the present invention.

Referring now to FIGS. 7A-7B, the multi-directional connector assembly 10, the HV electronic box 72, and the junction box assembly 92 are placed in a 270° configuration, or a fourth configuration. In this configuration, the junction box assembly 92 is connected to the HV electronic box 72 such that the second side 96*b* of the HV electronic box 72 is connected to the first side 102*a* of the junction box housing 76, and the aperture 94*b* of the HV electronic box 72 is aligned with the aperture 100*a* of the junction box housing 76. However, as shown in FIG. 7A, the junction box housing 76 is rotated 270° relative to the position of the junction box housing 76 shown in FIG. 4A. In the fourth configuration, the negative terminal 64*a* is still connected to the second negative bus bar connector flange 44*c* of the second negative bus bar 18*b*, but the negative terminal 64*a* positioned such that the screw 70*a* is inserted through the aperture 68*a* of the flange portion 66*a*, through the assembly aperture 20*d* and into the connection feature 22*d*. The positive terminal 64*b* in this configuration is connected to the connector flange 48*e* of the second positive bus bar 30*b* by inserting the screw 70*b* through the aperture 68*b* of the flange portion 66*b*, through the assembly aperture 32*d* and into the connection feature 34*d*. In the fourth configuration, the terminals 64*a*,64*b* and the battery terminals 74*a*,74*b*, extend away from the junction box housing 76 perpendicularly relative to the direction compared to direction the leads 58*a*,58*b* extend away from the HV electronic box 72.

In both the third configuration and the fourth configuration, the cover 104 is connected to the first side 96*a* of the HV electronic box 72. As with the first configuration as the second configuration, the aperture 100*b* of the junction box housing 76 allows for a tool to be used to assemble the screws 70*a*,70*b*, and the second cover is then attached to the second side 102*b* of the junction box housing 76.

During assembly, the junction box assembly 92 may be placed in one of the four configurations described above, by connecting the terminals 64*a*,64*b* to the desired bus bars 18*a*,18*b*,30*a*,30*b* as previously described. This allows for the junction box housing 76 to be used with various vehicle powertrain configurations, where the cables 88*a*,88*b* may be oriented relative to the HV electronic box 72 in various directions.

As previously mentioned, the first negative bus bar assembly flange 42a is welded to the second negative bus bar assembly flange 44a, the first positive bus bar assembly flange 46a is welded to the assembly flange 48a. Although a welding process is used, it is within the scope of the invention that the contact surfaces 50a,50b and the contact surfaces 54a,54b may have a surface treatment to provide suitable electrical communication, or the negative bus bars 18a,18b and the positive bus bars 30a,30b may be held together by the inner support housing 12 to provide a sufficient electrical connection as a result of the overmold process.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
a multi-directional connector assembly, including:
   a negative bus bar assembly;
   a positive bus bar assembly:
   an inner support housing connected to the positive bar assembly and the negative bus bar assembly; and
   a plurality of configurations, and in each of the plurality of configurations, a positive terminal is connected to the at least one positive bus bar assembly, and a negative terminal is connected to the at least one negative bus bar assembly;
   wherein in each of the plurality of configurations, the positive terminal positioned differently, and also in each of the plurality of configurations, the negative terminal is positioned differently.

2. The apparatus of claim 1, further comprising:
a first negative bus bar connector flange being part of the at least one negative bus bar assembly; and
a first positive bus bar connector flange being part of the at least one positive bus bar assembly, and the first negative bus bar connector flange and the first positive bus bar connector flange are in the same plane;
wherein the negative terminal is connected to the first negative bus bar connector flange and the positive terminal is connected to the first positive bus bar connector flange in a first of the plurality of configurations.

3. The apparatus of claim 2, further comprising:
a second positive bus bar connector flange being part of the at least one positive bus bar assembly;
wherein the second positive bus bar connector flange is in the same plane relative to the first positive bus bar connector flange, and the positive terminal is connected to the second positive bus bar connector flange in a second of the plurality of configurations, which is different from the first of the plurality of configurations.

4. The apparatus of claim 3, further comprising:
a second negative bus bar connector flange being part of the at least one negative bus bar assembly; and
a third positive bus bar connector flange being part of the at least one positive bus bar assembly, and the second positive bus bar connector flange, the second negative bus bar connector flange, and the third positive bus bar connector flange are in the same plane;
wherein the negative terminal is connected to the second negative bus bar connector flange, and the positive terminal is connected to the third positive bus bar connector flange in a third of the plurality of configurations, which is different from the second of the plurality of configurations.

5. The apparatus of claim 4, further comprising:
a fourth positive bus bar connector flange being part of the at least one positive bus bar assembly, fourth positive bus bar connector flange in the same plane as the third positive bus bar connector flange and the second negative bus bar connector flange;
wherein the negative terminal is connected to the second negative bus bar connector flange, and the positive terminal is connected to the fourth positive bus bar connector flange, in the fourth of the plurality of configurations, which is different from the third of the plurality of configurations.

6. The apparatus of claim 1, further comprising:
a first negative bus bar transition flange being part of the at least one negative bus bar assembly; and
a first positive bus bar transition flange being part of the at least one positive bus bar assembly;
wherein a portion of the inner support housing surrounds the first negative bus bar transition flange and another portion of the inner support housing surrounds the first positive bus bar transition flange.

7. The apparatus of claim 1, further comprising:
a first negative bus bar being part of the at least one negative bus bar assembly; and
a second negative bus bar being part of the at least one negative bus bar assembly;
wherein the first negative bus bar is connected to the second negative bus bar.

8. The apparatus of claim 7, further comprising:
a first negative bus bar assembly flange being part of the first negative bus bar; and
a second negative bus bar assembly flange being part of the second negative bus bar;
wherein the first negative bus bar assembly flange is connected to the second negative bus bar assembly flange such that there is electrical communication between the first negative bus bar assembly flange and the second negative bus bar assembly flange.

9. The apparatus of claim 8, wherein the first negative bus bar assembly flange is welded to the second negative bus bar assembly flange.

10. The apparatus of claim 8, further comprising a surface treatment on the first negative bus bar assembly flange and the second negative bus bar assembly flange, wherein the portion of the first negative bus bar assembly flange having the surface treatment is in contact with the portion of the second negative bus bar assembly flange having the surface treatment.

11. The apparatus of claim 8, further comprising:
an aperture formed as part of the first negative bus bar assembly flange; and
an aperture formed as part of the second negative bus bar assembly flange;
wherein a fastener is inserted through the aperture formed as part of the first negative bus bar assembly flange and the aperture formed as part of the second negative bus bar assembly flange and an aperture formed as part of the negative lead to connected the negative lead to the first negative bus bar and the second negative bus bar.

12. The apparatus of claim 1, further comprising:
a first positive bus bar being part of the at least one positive bus bar assembly; and
a second positive bus bar being part of the at least one positive bus bar assembly;

wherein the first positive bus bar is connected to the second positive bus bar.

13. The apparatus of claim 1, further comprising:
a first positive bus bar assembly flange being part of the first positive bus bar; and
a second positive bus bar assembly flange being part of the first positive bus bar;
wherein the first positive bus bar assembly flange is connected to the second positive bus bar assembly flange such that there is electrical communication between the first positive bus bar assembly flange and the second positive bus bar assembly flange.

14. The apparatus of claim 13, where the first positive bus bar assembly flange is welded to the second positive bus bar assembly flange.

15. The apparatus of claim 13, further comprising a surface treatment on the first positive bus bar assembly flange and the second positive bus bar assembly flange, wherein the portion of the first positive bus bar assembly flange having the surface treatment is in contact with the portion of the second positive bus bar assembly flange having the surface treatment.

16. The apparatus of claim 13, further comprising
an aperture formed as part of the first positive bus bar assembly flange; and
an aperture formed as part of the second positive bus bar assembly flange;
wherein a fastener is inserted through the aperture formed as part of first positive bus bar assembly flange and the aperture formed as part of the second positive bus bar assembly flange and an aperture formed as part of the positive lead to connect the positive lead to the first positive bus bar and the second positive bus bar.

17. A high-voltage electronic box assembly, comprising:
a high-voltage electronic box;
a multi-directional connector assembly located inside the high-voltage electronic box, comprising:
a first negative bus bar;
a second negative bus bar connected to an in electrical communication with the first negative bus bar, a negative lead is connected to and in electrical communication with the first negative bus bar and the second negative bus bar;
a first positive bus bar;
a second positive bus bar connected to an in electrical communication with the first positive bus bar, a positive lead is connected to and in electrical communication with the first positive bus bar and the second positive bus bar;
an inner support housing, and the first negative bus bar, the second negative bus bar, the first positive bus bar, and the second positive bus bar are connected to the inner support housing;
a junction box housing connected to the high-voltage electronic box;
a negative terminal located in the junction box housing;
a positive terminal located in the junction box housing;
a plurality of configurations, the junction box housing is attached to the high-voltage electronic box differently in each of the plurality of configurations;
wherein the negative terminal is connected to the first negative bus bar in a first of the plurality of configurations and a second of the plurality of configurations, and the negative terminal is connected to the second negative bus bar in a third of the plurality of configurations and a fourth of the plurality of configurations, the positive terminal is connected to the first positive bus bar in the first of the plurality of configurations and the second of the plurality of configurations, and the positive terminal is connected to the second positive bus bar in the third of the plurality of configurations and the fourth of the plurality of configurations.

18. The high-voltage electronic box assembly of claim 17, wherein the negative lead and the positive lead extend out of the junction box housing.

19. The high-voltage electronic box assembly of claim 17, further comprising:
a first negative bus bar assembly flange being part of the first negative bus bar;
a first negative bus bar transition flange integrally formed with the a first negative bus bar assembly flange and is part of first negative bus bar;
a first negative bus bar connector flange integrally formed with the first negative bus bar transition flange and is part of the first negative bus bar;
a second negative bus bar assembly flange being part of the second negative bus bar, the second negative bus bar assembly flange is in contact with the first negative bus bar assembly flange;
a second negative bus bar transition flange integrally formed with the second negative bus bar assembly flange and being part of the second negative bus bar; and
a second negative bus bar connector flange integrally formed with the second negative bus bar transition flange and being part of the second negative bus bar;
wherein in the first of the plurality of configurations and in the second of the plurality of configurations, the negative terminal is connected to the first negative bus bar connector flange, and in the third of the plurality of configurations and the fourth of the plurality of configurations the negative terminal is connected to the second negative bus bar connector flange.

20. The high-voltage electronic box assembly of claim 19, wherein a portion of the inner support housing is overmolded around the first negative bus bar transition flange, and another portion of the inner support house is overmolded around the second negative bus bar transition flange.

21. The high-voltage electronic box assembly of claim 19, wherein the first negative bus bar assembly flange is welded to the second negative bus bar assembly flange such that there is electrical communication between the first negative bus bar and the second negative bus bar.

22. The high-voltage electronic box assembly of claim 19, further comprising a surface treatment on the first negative bus bar assembly flange and the second negative bus bar assembly flange, wherein the portion of the first negative bus bar assembly flange having the surface treatment is in contact with the portion of the second negative bus bar assembly flange having the surface treatment.

23. The high-voltage electronic box assembly of claim 19, further comprising:
an aperture formed as part of the first negative bus bar assembly flange; and
an aperture formed as part of the second negative bus bar assembly flange;
wherein a fastener is inserted through the aperture formed as part of the first negative bus bar assembly flange and the aperture formed as part of the second negative bus bar assembly flange and an aperture formed as part of the negative lead to connect the negative lead to the first negative bus bar and the second negative bus bar.

24. The apparatus of claim 17, further comprising:

a first positive bus bar assembly flange being part of the first positive bus bar;

a first positive bus bar transition flange integrally formed with the first positive bus bar assembly flange and is part of first positive bus bar;

a first positive bus bar connector flange integrally formed with the first positive bus bar transition flange and is part of first positive bus bar;

a second positive bus bar transition flange integrally formed with the first positive bus bar assembly flange, the second positive bus bar transition flange being part of the first positive bus bar;

a second positive bus bar connector flange integrally formed with the second positive bus bar transition flange, and is part of the first positive bus bar;

a second positive bus bar assembly flange being part of the second positive bus bar, the second positive bus bar assembly flange is in contact with and in electrical connection with the first positive bus bar assembly flange;

a third positive bus bar transition flange integrally formed with the second positive bus bar assembly flange, and is part of the second positive bus bar;

a third positive bus bar connector flange integrally formed with the third positive bus bar transition flange and is part of second positive bus bar; and a fourth positive bus bar transition flange integrally formed with the second positive bus bar assembly flange, and is part of the second positive bus bar;

a fourth positive bus bar connector flange integrally formed with the second positive bus bar assembly flange, and is part of second positive bus bar;

wherein in the first of the plurality of configurations, the positive terminal is connected to the first positive bus bar connector flange, and in the second of the plurality of configurations, the positive terminal is connected to the second positive bus bar connector flange, and in the third of the plurality of configurations the positive terminal is connected to the third positive bus bar connector flange, and in the fourth of the plurality of configurations, the positive terminal is connected to the fourth positive bus bar connector flange.

25. The apparatus of claim 24, wherein a first portion of the inner support housing is overmolded around the first positive bus bar transition flange, a second portion of the inner support housing is overmolded around the second positive bus bar transition flange, a third portion of the inner support housing is overmolded around the third positive bus bar transition flange, and a fourth portion of the inner support housing is overmolded around the fourth positive bus bar transition flange.

26. The apparatus of claim 24, wherein first positive bus bar assembly flange is welded to the second positive bus bar assembly flange such that there is electrical communication between the first positive bus bar and the second positive bus bar.

27. The apparatus of claim 24, further comprising a surface treatment on the first positive bus bar assembly flange and the second positive bus bar assembly flange, wherein the portion of the first positive bus bar assembly flange having the surface treatment is in contact with the portion of the second positive bus bar assembly flange having the surface treatment.

28. The apparatus of claim 24, further comprising:

an aperture formed as part of the first positive bus bar assembly flange; and an aperture formed as part of the second positive bus bar assembly flange;

wherein a fastener is inserted through the aperture formed as part of the first positive bus bar assembly flange and the aperture formed as part of the second positive bus bar assembly flange and an aperture formed as part of the positive lead to connect the positive lead to the first positive bus bar.

* * * * *